W. R. COCKBURN.
MILKING MACHINE RELEASER.
APPLICATION FILED JAN. 5, 1914.
1,121,069.
Patented Dec. 15, 1914.
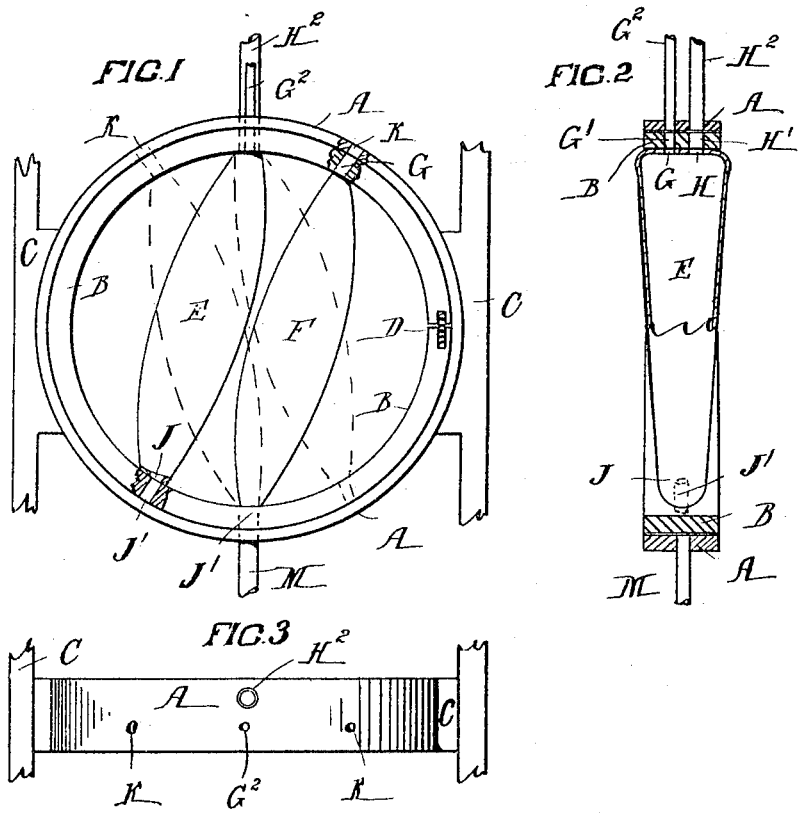
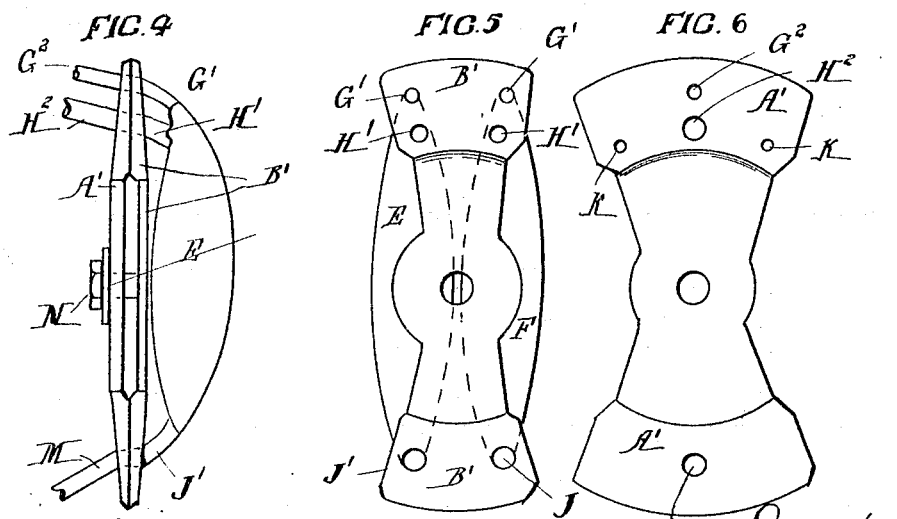

UNITED STATES PATENT OFFICE.

WILLIAM REGINALD COCKBURN, OF WARDVILLE, NEW ZEALAND, ASSIGNOR OF ONE-HALF TO ALEXANDER JAMES TOOGOOD, OF FEATHERSTON, NEW ZEALAND.

MILKING-MACHINE RELEASER.

1,121,069.  Specification of Letters Patent.  Patented Dec. 15, 1914.

Application filed January 5, 1914. Serial No. 810,430.

*To all whom it may concern:*

Be it known that I, WILLIAM REGINALD COCKBURN, subject of the King of Great Britain, residing at Wardville, Auckland, New Zealand, have invented a new and useful Improved Milking-Machine Releaser; and I do hereby declare the following to be a full, clear, and exact description of the same.

This invention has been designed in order to provide an improved construction of releaser for use in milking machine installations and by means of which the milk flowing along a main milk vacuum pipe may be intercepted and delivered to a suitable receiving vessel.

The invention provides for a simple and cheap form of apparatus, in the working of which the degree of breaking down the milk controlling vacuum is reduced to a minimum and in which also there is slight wear on the working parts. The construction is also such that the several fittings and connections may be readily kept clean.

In describing the invention reference will be made to the accompanying sheet of drawings, in which:—

Figure 1 is a front elevation, partly in section, Fig. 2 a cross sectional elevation, and Fig. 3 a plan of one manner of constructing the invention. Fig. 4 is a side elevation of an alternative manner of constructing the invention, while, Figs. 5 and 6 are face views of the respective plates employed in this construction.

According to the construction shown in Figs. 1 to 3 the releaser consists of two cylindrical rings A and B of approved width and diameter arranged one B within the other A in such a manner that close joint is made between their adjacent surfaces while the inner ring B is capable of rotating in the outer ring. The outer ring A is fixed to a suitable framing C by means of which it is kept stationary and the whole apparatus supported to hold the rings in a vertical plane. If desired the inner ring may be split and spring cushioned at D so that any wear thereon may be taken up and a close joint with the outer ring maintained.

Arranged vertically within the inner ring are a pair of canisters E—F of the required capacity. These canisters are fixed with their top and bottom ends attached to the inside ring and equi-distant from a vertical line passing through the center of the ring. At the top end each canister is formed with a pair of openings G and H (Fig. 2) connecting with ports G'—H' made in the inner ring B, and hereinafter referred to respectively as the vacuum and the milk port. At the lower end each canister has a single opening J connecting with a port J' in the inner ring and hereinafter termed the discharge port.

Situated in the outer ring vertically above its center are two pipe connections $G^2$—$H^2$ passing in through the ring and arranged respectively to connect with the source of vacuum employed in the milking operations and with the milk pipe line leading to the teat cups. These connections $G^2$—$H^2$ are so arranged that when the inner ring is turned in one direction, the milk and vacuum ports G'—H' of the canister on the reverse side will be brought into coincidence respectively with the milk and vacuum connections so that such canister will be interposed into the milk vacuum line and thereby trap the milk flowing along it. When the ring is moved in the other direction, this connection will be broken and the other canister brought into the position to receive the milk. In the outer ring, on each side of the central milk and vacuum connections is an air admission port K. These ports are arranged at equal distances from the central line and are so situated that when the cistern on the corresponding side is moved out of connection with the milk vacuum pipes $G^2$—$H^2$ one of the ports G' is made to coincide with the air admission port K and thereby break down the vacuum that existed in the canister.

A discharge pipe M is situated in the outer ring vertically beneath its center and this discharge pipe is adapted to coincide with the discharge port J—J' of each cistern when it is moved to break connection with the milk and vacuum and to make connection with the air aperture. At other times the discharge port of the cistern engages a solid portion of the outer ring. In the working of the releaser therefore, the inner ring is rocked reciprocally within the outer ring. As it moves in one direction, the cistern F on the same side is brought into connection with the air port K and the discharge aperture M while the other cistern is positioned to receive the milk as shown by the full lines in Fig. 1. Then when the ring is rocked in the reverse direction, the first cistern F is brought into connection with the milk vacuum line while the second E is connected with the air port K on its side and the discharge port M so that the milk within it runs out into the receptacle arranged below to receive it as shown by the dotted lines in Fig. 1. These operations are then repeated, the cisterns being alternately filled with the milk and discharged.

The inner ring is rocked reciprocally by any suitable and approved mechanism arranged and actuating in such a manner as to allow for the ring at each limit of its movement to remain stationary for a sufficient period to permit of the cisterns being filled, or about filled, with the milk, and then for the change to be effected quickly in order that no considerable check shall be caused upon the milking operations. This mechanism may consist of vacuum actuated apparatus worked on the well known "pulsator" principle or other mechanically actuated means.

Instead of the members having the ports therein being of the cylindrical ring form shown in Figs. 1 to 3 they may be of annular segmental plate form as shown in Figs. 4 to 6 and arranged so that their vertical faces fit together, the canisters E—F being carried on the outer plate B' and the milk and vacuum connections $G^2$—$H^2$ and the discharge connections M being made with the inner plate A' in a concentric line with the canister ports in the outer plate. Either of these plates may be rocked on a centrally arranged pivot N so that the two canisters are brought alternately and reversely into the milk supply line and the air discharge line.

What I do claim as my invention, and desire to secure by Letters Patent is:—

1. A milking machine releaser comprising in combination, a cylindrical casing, a ring rotatably secured within said casing, diametrically opposite fluid inlet and outlets provided in said casing, a pair of elliptical shaped containers secured to said ring positioned on opposite sides of the diameter of said ring, their longest dimensions being parallel chords equi-distant from the center of said ring, outlets and inlets provided for each of said containers, and an inlet formed on both sides of the fluid inlet of said casing adapted to register with one of said container inlets, when the other container inlet registers with said casing fluid inlet, substantially as described.

2. A milking machine releaser comprising in combination a stationary cylindrical casing, a ring rotatably secured within said casing, diametrically opposite fluid inlet and outlets provided in said casing, a pair of elliptical shaped containers secured to said ring, positioned on opposite sides of the diameter of said ring, their longest dimensions being parallel chords equi-distant from the center of said ring, inlets and outlets provided for each of said containers, air admission inlets formed on both sides of the fluid inlet of said casing adapted to register with one of said container inlets, when the other container inlet registers with said casing fluid inlet, and means for expanding said ring, substantially as described.

In testimony whereof, I have signed this specification in the presence of two subscribing witnesses.

WILLIAM REGINALD COCKBURN.

Witnesses:
  E. BROOKE SMITH,
  E. F. COURTNEY.

Copies of this patent may be obtained for five cents each, by addressing the "Commissioner of Patents, Washington, D. C."